Feb. 28, 1939.   A. LESAGE   2,148,867

DIVISIBLE BOWDEN DEVICE

Filed Feb. 8, 1938

Inventor

Alfred Lesage

Patented Feb. 28, 1939

2,148,867

UNITED STATES PATENT OFFICE 2,148,867

DIVISIBLE BOWDEN DEVICE

Alfred Lesage, Schweinfurt, Germany

Application February 8, 1938, Serial No. 189,414
In Germany February 17, 1937

8 Claims. (Cl. 74—501)

This invention relates to Bowden wires or cables of the well-known type used in bicycles for controlling multiple speed gears, brakes and clutches, used in motor-vehicles for regulating carburetors, air feeding and starting appliances and used in general for many other purposes.

When the part or member controlled by means of the Bowden wire is to be removed from the place where it is fastened, the pulling Bowden wire must also be removed and must subsequently be replaced when the said part is re-mounted. Thereafter the pulling member must be adjusted anew to obtain correct operation. This mounting requires skill and causes waste of time.

The object of the invention is to provide an arrangement which does away with the necessity of dismounting and replacing the Bowden wire in its entirety and which enables repairing and re-mounting the disconnected elements.

This object is attained by rendering the Bowden wire divisible at a point where a coupling device is not objectionable, so that the two parts of the Bowden wire separated from each other may remain in undisturbed connection with their respective control members. By this arrangement the particular element or device to be removed may be taken off the vehicle together with the part of the Bowden wire attached to it, so that the parts may be freely inspected and repaired.

This divisible coupling arrangement also eliminates other inconveniences hitherto inherent in Bowden wires. The Bowden wire provided with this coupling may be fastened to the bicycle or motor vehicle frame, or in stationary installations to a fixed structure, almost over its entire length so as to be immobilized and less conspicuous. In this way it is possible to avoid the loosely depending loops of the Bowden wire, which may interfere with the operation of the vehicle and which have an ugly appearance. Moreover, by the insertion of the said connecting appliance or lock the handling of the Bowden wire is rendered more comfortable to the user.

In the accompanying drawing, which forms a part of this specification, several embodiments of the invention are represented by way of example.

Like numerals designate like or similar parts throughout all figures of the drawing.

In the embodiment shown by Figs. 1 to 4 the connecting lock or coupling of the Bowden device comprises two parts which are held in their operative position by co-operating safety means. One part is intended for connecting the two parts of the pull element and the other for connecting the corresponding parts of the flexible guiding tube or sheath.

Figure 1:
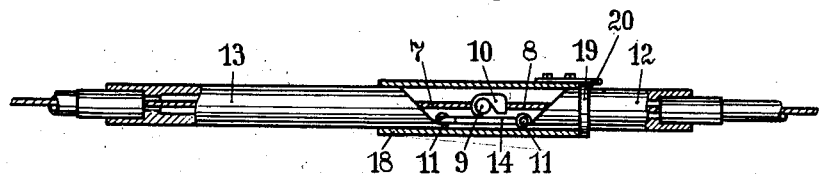
Fig. 1 is a side elevation, partly in section, of one form of Bowden wire coupling, embodying the present invention, and showing the sheath of the lock in closed position.
Figure 2:
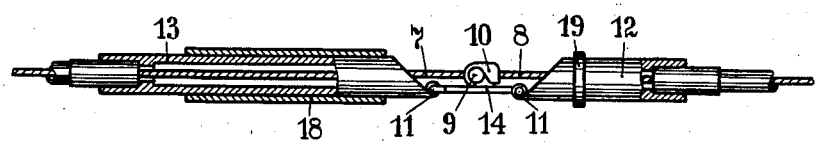
Fig. 2 is an elevation like Fig. 1, but showing the sheath in its open position.
Figure 3:
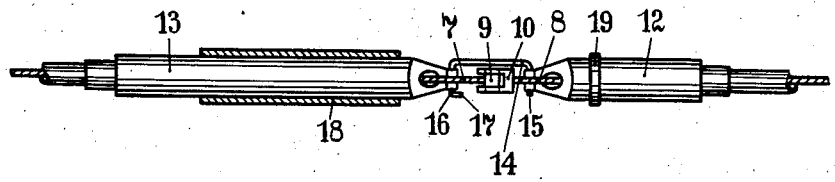
Fig. 3 is a top plan view of the lock in the same position as in Fig. 2.
Figure 4:
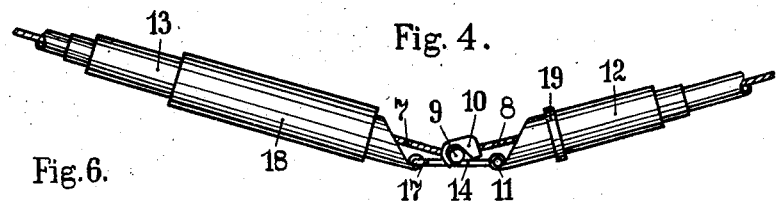
Fig. 4 represents the sheath or hose of the Bowden device in an angular position.
Figure 6:
Fig. 6 represents another connection of the two parts of the Bowden traction element.

The appliance devised for connecting the two parts 7 and 8 of the pull wire or cable consists in a cross pin 9 to which part 7 is fastened, e. g., by soldering or by a knot behind a transverse bore in the pin through which it passes, and in a double hook 10, which engages or clasps the said pin laterally of the wire 7 and to which the end of the wire 8 is secured in a manner similar to that indicated above for the wire 7. Instead of this appliance a hook-and-eye connection 9a, 10a may be used, as represented in Fig. 6. This connection device with compensation and tension springs is conventionally used in Bowden wires.

The appliance employed for the readily disconnectable junction of the two parts of the guiding tube comprises two shells 12 and 13 of metal or other material, chamfered and provided with inturned eyes 11 at their inner ends, in the interior of which shells the wires 7 and 8 respectively are movable lengthwise. The two eyes 11 of the parts 12 and 13 are engaged by the limbs 15 and 16 of a U-shaped hook 14. In this way there is obtained a hinged connection permitting of the two shells 12 and 13 being set at various angles relatively to each other so that the two wire portions 7 and 8 can be moved toward each other and the hook 10 then disengaged from the cross pin 9, as can easily be seen from Fig. 4. While the limb 16 is secured in its eye by a short bend 17 or a knob the limb 15 may be withdrawn from its eye when the two shells 12 and 13 are displaced transversely to each other. With the aid of these means the two halves of the wire and of the guiding tube thereof respectively may be separated and joined again.

In its operative position the lock is secured against accidental disconnection by a stiff sliding sleeve 18 shoved over the abutting shells 12, 13. The displacement of said sleeve in one direction is limited by a collar 19; there may however also be provided an additionally locking means, such as a spring catch 20 in Fig. 1. The sleeve 18 so forms the stiffening element of the two ends 12 and 13 to be connected. The Bowden wire being disconnected, the sliding sleeve 18 occupies the position shown in Figs. 2 to 4.

Figure 5:
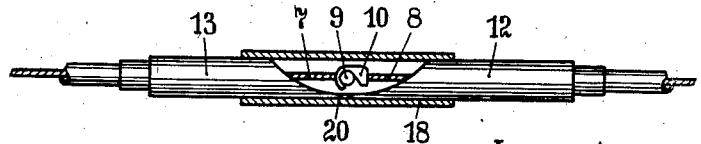
Fig. 5 shows another embodiment, partly in section in which the hinged connection of the parts of the sheath may be dispensed with by the use of abutments.

In the second embodiment shown in Fig. 5 the eyes and the U-shaped part 14 forming the hinged joint are done away with by the chamfered ends 20 of the shells 12 and 13 abutting against or interengaging with each other by means of projections formed at their ends so to to form stops when being pressed against each other by the springs used in the Bowden wire system. These shells are held against lateral displacement by the shiftable sleeve 18. After this sleeve 18 has been displaced lengthwise into its inoperative position (Figs. 2–4) the two shells 12 and 13 may be swung transversely relatively to each other and brought nearer together longitudinally so as to permit of the wire connection being undone.

The connecting lock of this construction may be used at several points of a Bowden wire as well as in connection with a number of joint Bowden wires.

I claim:

1. A coupling for the two ends of Bowden cables and the sheaths of said cables, comprising means for detachably fastening the opposed ends of said cables together, a sleeve embracing the adjacent ends of said sheaths, and shiftable to clear one of said sheaths to render said fastening means accessible for disengagement, and means secured to the adjacent ends of said sheaths for holding said sheaths in predetermined spaced relationship independently of said sleeve, said latter means permitting said sheaths to be moved into relative angular relationship to allow disengagement of said cable ends.

2. A coupling for the two ends of Bowden cables and the sheaths of said cables, comprising means for detachably fastening the opposed ends of said cables together, a sleeve embracing the adjacent ends of said sheaths and shiftable to clear one of said sheaths to render said fastening means accessible for disengagement, and means on the adjacent ends of said sheaths for holding said sheaths in predetermined spaced relationship independently of said sleeve, while permitting said sheaths to be moved into relative angular relationship to allow disengagement of said cable ends, said holding means being disengageable by relative transverse movement of said sheaths.

3. A coupling for the ends of Bowden cables and the sheaths of said cables, comprising means for detachably fastening the ends of said cables together, a sleeve embracing the adjacent ends of said sheaths and shiftable to clear one of said sheaths to render said fastening means accessible for disengagement, said sheaths having stiffening opposed projections chamfered at their outer ends, and means on the outer ends of said chamfered projections for holding said sheaths in predetermined spaced relationship independently of said sleeve, while permitting said sheaths to be moved into relative angular relationship to allow disengagement of said cable ends.

4. A coupling for the ends of Bowden cables and the sheaths of said cables, comprising a hook-off device for detachably fastening the ends of said cables together, a sleeve embracing the adjacent ends of said sheaths and shiftable to clear one of said sheaths to render said hook-off device accessible for disengagement, and a hinge connection between the adjacent ends of said sheaths for holding said sheaths in predetermined spaced relationship independently of said sleeve.

5. A coupling for the ends of Bowden cables and the sheaths of said cables, comprising means for detachably fastening the ends of said cables together, a sleeve embracing the adjacent ends of said sheaths and shiftable to clear one of said sheaths to render said fastening means accessible for disengagement, and a substantially U-shaped hook-off device between the adjacent ends of said sheaths for hingedly holding said sheaths in predetermined spaced relationship independently of said sleeve, said device being disengaged from one of said sheaths by relative transfer movement of said sheaths.

6. A coupling for the ends of Bowden cables and the sheaths of said cables, comprising means for detachably fastening the ends of said cables together, a sleeve embracing the adjacent ends of said sheaths and shiftable to clear one of said sheaths to render said fastening means accessible for disengagement, and a substantially U-shaped hook device permanently secured to one end of said sheaths and detachably engaging the opposed end of the other sheath, for hingedly holding said sheaths in predetermined spaced relationship independently of said sleeve.

7. A coupling for the two ends of Bowden cables and the sheaths of said cables, comprising means for detachably fastening the ends of said cables, a sleeve embracing the adjacent ends of said sheaths and shiftable to clear one of said sheaths to render said fastening means accessible for disengagement, an abutment on one of said sheaths for limiting the movement of said sleeve in sheaths embracing direction, and means on the adjacent ends of said sheaths for holding said sheaths in predetermined spaced relationship independently of said sleeve, said latter means permitting said sheaths to be moved into relative angular relationship to allow disengagement of said cable ends.

8. A coupling for the two ends of Bowden cables and the sheaths of said cables, comprising means for detachably fastening the ends of said cables, a sleeve embracing the adjacent ends of said sheaths and shiftable to clear one of said sheaths to render said fastening means accessible for disengagement, a latch connection between said sleeve and one of said sheaths for holding said sleeve in operative sheaths embracing position, and means between adjacent ends of said sheaths for holding said sheaths in predetermined spaced relationship independently of said sleeve, said latter means permitting said sheaths to be moved into relative angular relationship to allow disengagement of said cable ends.

ALFRED LESAGE.